US 12,425,553 B2

(12) United States Patent
Okamoto

(10) Patent No.: US 12,425,553 B2
(45) Date of Patent: Sep. 23, 2025

(54) PROJECTION DISPLAY DEVICE AND VIDEO CORRECTION METHOD

(71) Applicant: JVCKENWOOD Corporation, Yokohama (JP)

(72) Inventor: Naoya Okamoto, Yokohama (JP)

(73) Assignee: JVCKENWOOD Corporation, Yokohama (JP)

( * ) Notice: Subject to any disclaimer, the term of this patent is extended or adjusted under 35 U.S.C. 154(b) by 0 days.

(21) Appl. No.: 18/652,011

(22) Filed: May 1, 2024

(65) Prior Publication Data

US 2024/0430392 A1 Dec. 26, 2024

(30) Foreign Application Priority Data

Jun. 23, 2023 (JP) .................... 2023103124

(51) Int. Cl.
*H04N 9/31* (2006.01)
*G06T 7/90* (2017.01)

(52) U.S. Cl.
CPC ............. *H04N 9/3194* (2013.01); *G06T 7/90* (2017.01); *H04N 9/3167* (2013.01); *H04N 9/3182* (2013.01); *G06T 2207/10024* (2013.01); *H04N 9/3152* (2013.01)

(58) Field of Classification Search
CPC .... H04N 9/3182; H04N 9/3105; H04N 9/312; H04N 9/31; H04N 9/3152; H04N 9/3167; H04N 9/3194; G06T 7/90; G06T 2207/10024

USPC ....... 348/744, 750, 751, 756, 760, 761, 766, 348/781, 791, 802, 803, 807, 808
See application file for complete search history.

(56) References Cited

U.S. PATENT DOCUMENTS

2021/0200076 A1* 7/2021 Iguchi .................. H04N 9/3161
2021/0216001 A1* 7/2021 Kyosuna ................ H04N 9/312

FOREIGN PATENT DOCUMENTS

JP 2015-118224 A 6/2015

* cited by examiner

*Primary Examiner* — Sherrie Hsia
(74) *Attorney, Agent, or Firm* — Nath, Goldberg & Meyer; Jerald L. Meyer

(57) ABSTRACT

A video analysis unit calculates an intensity of re-entering illumination light that is first polarized light, among first polarized light entering a reflective liquid crystal display element which is included in illumination light having the first polarized light and second polarized light, for each pixel constituting a target frame, the first polarized light being reflected by the reflective liquid crystal display element without being modulated by the reflective liquid crystal display element, returning to a position closer to a light source unit, and re-entering the reflective liquid crystal display element. The video analysis unit calculates a sum obtained by summing the intensity of the re-entering illumination light calculated for all pixels. A video correction amount determining unit determines a correction amount to be added to or subtracted from a pixel value of each pixel according to a difference between the sum and a reference sum of a reference frame image.

6 Claims, 10 Drawing Sheets

| INPUT VALUE | OUTPUT VALUE | CORRECTION AMOUNT |
|---|---|---|
| 0 | 0 | 0 |
| 1 | 1 | 0 |
| 2 | 2 | 0 |
| 3 | 3 | 0 |
| 4 | 4 | 0 |
| 5 | 5 | 0 |
| ... | ... | ... |
| 1019 | 1019 | 0 |
| 1020 | 1020 | 0 |
| 1021 | 1021 | 0 |
| 1022 | 1022 | 0 |
| 1023 | 1023 | 0 |

(b) 33L

| INPUT VALUE | OUTPUT VALUE | CORRECTION AMOUNT |
|---|---|---|
| 0 | 0 | 0 |
| 1 | 1 | 0 |
| 2 | 1 | −1 |
| 3 | 2 | −1 |
| 4 | 2 | −2 |
| 5 | 3 | −2 |
| ... | ... | ... |
| 1019 | 971 | −48 |
| 1020 | 971 | −49 |
| 1021 | 972 | −49 |
| 1022 | 972 | −50 |
| 1023 | 973 | −50 |

(c) 33L

| INPUT VALUE | OUTPUT VALUE | CORRECTION AMOUNT |
|---|---|---|
| 0 | 50 | +50 |
| 1 | 51 | +50 |
| 2 | 51 | +49 |
| 3 | 52 | +49 |
| 4 | 52 | +48 |
| 5 | 53 | +48 |
| ... | ... | ... |
| 1019 | 1021 | +2 |
| 1020 | 1021 | +1 |
| 1021 | 1022 | +1 |
| 1022 | 1022 | 0 |
| 1023 | 1023 | 0 |

(d) 33L

| INPUT VALUE | OUTPUT VALUE | CORRECTION AMOUNT |
|---|---|---|
| 0 | 25 | +25 |
| 1 | 26 | +25 |
| 2 | 26 | +24 |
| 3 | 27 | +24 |
| 4 | 27 | +23 |
| 5 | 28 | +23 |
| ... | ... | ... |
| 1019 | 996 | −23 |
| 1020 | 996 | −24 |
| 1021 | 997 | −24 |
| 1022 | 997 | −25 |
| 1023 | 998 | −25 |

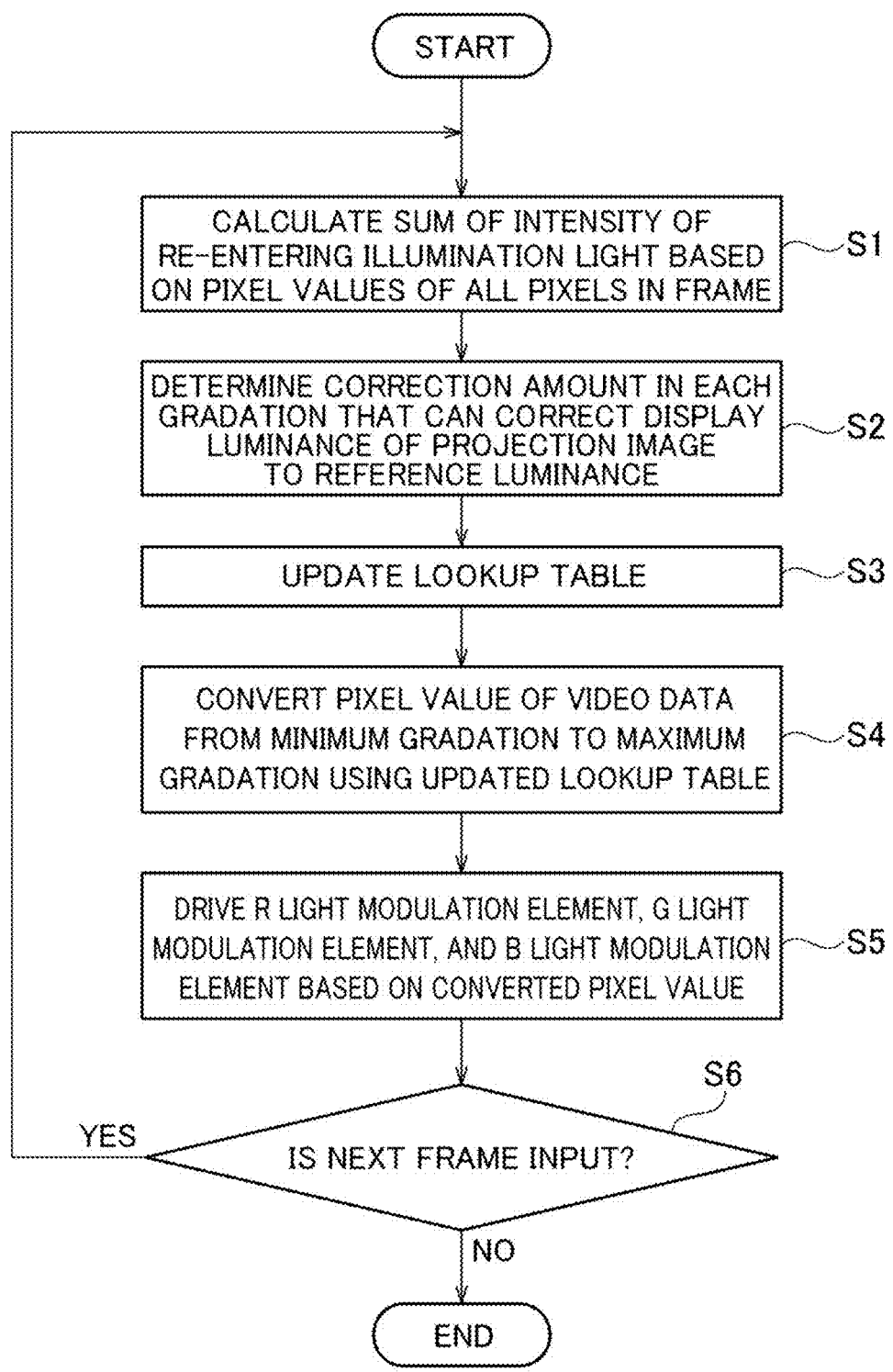

PROJECTION DISPLAY DEVICE AND VIDEO CORRECTION METHOD

CROSS REFERENCE TO RELATED APPLICATIONS

This application is based upon and claims the benefit of priority under 35 U.S.C. § 119 from Japanese Patent Application No. 2023-103124 filed on Jun. 23, 2023, the entire contents of which are incorporated herein by reference.

BACKGROUND

The present disclosure relates to a projection display device and a video correction method.

In a projection display device using a reflective liquid crystal display element as a light modulation element, among illumination light which enters the reflective liquid crystal display element, illumination light other than modulated light returns to an illumination optical system or a light source unit, the modulated light being modulated according to an image to be displayed, being reflected, and being directed to a projection lens. The illumination light which returns to the illumination optical system or the light source unit may be reflected in the illumination optical system or the light source unit and re-enter the reflective liquid crystal display element.

In a certain pixel, the illumination light does not enter the certain pixel which is the same pixel, but is used to irradiate the entire reflective liquid crystal display element, the illumination light returning to the illumination optical system or the light source unit, being reflected in the illumination optical system or the light source unit, and re-entering the reflective liquid crystal display element. Therefore, when the illumination light re-enters the reflective liquid crystal display element, the display luminance of each pixel of each frame changes by being affected by pixel values of an entire frame.

As an example, first to third frames in which video data is 8 bits are compared. A gradation of the entire first frame is 128. A central region of the second frame has a gradation of 128, and a surrounding region has a gradation of 0 (black). A central region of the third frame has a gradation of 128, and a surrounding region has a gradation of 255 (white). In this case, the display luminance of the first frame of a gradation of 128, the display luminance of the region of a gradation of 128 in the second frame, and the display luminance of the region of a gradation of 128 in the third frame differ from each other, because the degree of influence due to re-entering of the illumination light is different.

SUMMARY

Japanese Unexamined Patent Application Publication No. 2015-118224 discloses that in order to compensate for an influence of re-entering illumination light, any one of color data of red (R), green (G), and blue (B) in video data is multiplied by a gain and the balance of R, G, and B is adjusted. However, when the amount of change in the display luminance caused by the re-entering illumination light changes according to a gradation of the video data, it is not possible to appropriately correct a change in the display luminance merely by adjusting the balance of R, G, and B.

A first aspect of one or more embodiments provides a projection display device including: a video analysis unit configured to calculate an intensity of re-entering illumination light that is first polarized light, among first polarized light entering a reflective liquid crystal display element through a polarizing plate which is included in illumination light having the first polarized light and second polarized light, for each pixel constituting a target frame of which video is analyzed in video data displayed on the reflective liquid crystal display element, by considering a gamma characteristic of an output gradation relative to an input gradation of the reflective liquid crystal display element, the first polarized light being reflected by the reflective liquid crystal display element without being modulated by the reflective liquid crystal display element, returning to a position closer to a light source unit than the polarizing plate, being reflected by an optical element located at a position closer to the light source unit than the polarizing plate or by the light source unit, and re-entering the reflective liquid crystal display element through the polarizing plate, and is configured to calculate a sum obtained by summing the intensity of the re-entering illumination light calculated for all pixels constituting the target frame; and a video correction amount determining unit configured to determine a correction amount to be added to or subtracted from a pixel value of each pixel constituting each frame in the video data by considering the gamma characteristic according to a difference between the sum calculated for the target frame by the video analysis unit, and a reference sum that is obtained by summing the intensity of the re-entering illumination light of each pixel constituting a reference frame image for all pixels and is calculated in advance by considering the gamma characteristic when the reference frame image set according to a gradation of each pixel constituting the target frame is displayed.

A second aspect of one or more embodiments provides a projection display device including: a red video analysis unit configured to calculate an intensity of re-entering illumination light that is first polarized light, among first polarized light entering a reflective liquid crystal display element for red through a polarizing plate which is included in illumination light having the first polarized light and second polarized light, for each pixel constituting a target frame of which video is analyzed in red data displayed on the reflective liquid crystal display element for red, by considering a gamma characteristic of an output gradation relative to an input gradation of the reflective liquid crystal display element for red, the first polarized light being reflected by the reflective liquid crystal display element for red without being modulated by the reflective liquid crystal display element for red, returning to a position closer to a light source unit than the polarizing plate, being reflected by an optical element located at a position closer to the light source unit than the polarizing plate or by the light source unit, and re-entering the reflective liquid crystal display element for red through the polarizing plate, and is configured to calculate a sum obtained by summing the intensity of the re-entering illumination light calculated for all pixels constituting the target frame; a green video analysis unit configured to calculate an intensity of re-entering illumination light that is first polarized light, among first polarized light entering a reflective liquid crystal display element for green through a polarizing plate which is included in illumination light having the first polarized light and second polarized light, for each pixel constituting a target frame of which video is analyzed in green data displayed on the reflective liquid crystal display element for green, by considering a gamma characteristic of an output gradation relative to an input gradation of the reflective liquid crystal display element for green, the first polarized light being reflected by the reflective liquid crystal display element for green without being modulated by the reflective liquid crystal display element for green, returning to a position closer to a light source unit than the polarizing plate, being reflected by an optical element located at a position closer to the light source unit than the polarizing plate or by the light source unit, and re-entering the reflective liquid crystal display element for green through the polarizing plate, and is configured to calculate a sum obtained by summing the intensity of the re-entering illumination light calculated for all pixels constituting the target frame; a blue video analysis unit configured to calculate an intensity of re-entering illumination light that is first polarized light, among first polarized light entering a reflective liquid crystal display element for blue through a polarizing plate which is included in illumination light having the first polarized light and second polarized light, for each pixel constituting a target frame of which video is analyzed in blue data displayed on the reflective liquid crystal display element for blue, by considering a gamma characteristic of an output gradation relative to an input gradation of the reflective liquid crystal display element for blue, the first polarized light being reflected by the reflective liquid crystal display element for blue without being modulated by the reflective liquid crystal display element for blue, returning to a position closer to a light source unit than the polarizing plate, being reflected by an optical element located at a position closer to the light source unit than the polarizing plate or by the light source unit, and re-entering the reflective liquid crystal display element for blue through the polarizing plate, and is configured to calculate a sum obtained by summing the intensity of the re-entering illumination light calculated for all pixels constituting the target frame; a red video correction amount determining unit configured to determine a correction amount to be added to or subtracted from a pixel value of each pixel constituting each frame in the red data by considering the gamma characteristic according to a difference between the sum calculated for the target frame by the red video analysis unit, and a reference sum that is obtained by summing the intensity of the re-entering illumination light of each pixel constituting a red reference frame image for all pixels and is calculated in advance by considering the gamma characteristic when the red reference frame image set according to a gradation of each pixel constituting the target frame is displayed; a green video correction amount determining unit configured to determine a correction amount to be added to or subtracted from a pixel value of each pixel constituting each frame in the green data by considering the gamma characteristic according to a difference between the sum calculated for the target frame by the green video analysis unit, and a reference sum that is obtained by summing the intensity of the re-entering illumination light of each pixel constituting a green reference frame image for all pixels and is calculated in advance by considering the gamma characteristic when the green reference frame image set according to a gradation of each pixel constituting the target frame is displayed; and a blue video correction amount determining unit configured to determine a correction amount to be added to or subtracted from a pixel value of each pixel constituting each frame in the blue data by considering the gamma characteristic according to a difference between the sum calculated for the target frame by the blue video analysis unit, and a reference sum that is obtained by summing the intensity of the re-entering illumination light of each pixel constituting a blue reference frame image for all pixels and is calculated in advance by considering the gamma characteristic when the blue reference frame image set according to a gradation of each pixel constituting the target frame is displayed.

A third aspect of one or more embodiments provides a video correction method including: calculating an intensity of re-entering illumination light that is first polarized light, among first polarized light entering a reflective liquid crystal display element through a polarizing plate which is included in illumination light having the first polarized light and second polarized light, for each pixel constituting a target frame of which video is analyzed in video data displayed on the reflective liquid crystal display element, by considering a gamma characteristic of an output gradation relative to an input gradation of the reflective liquid crystal display element, the first polarized light being reflected by the reflective liquid crystal display element without being modulated by the reflective liquid crystal display element, returning to a position closer to a light source unit than the polarizing plate, being reflected by an optical element located at a position closer to the light source unit than the polarizing plate or by the light source unit, and re-entering the reflective liquid crystal display element through the polarizing plate; calculating a sum obtained by summing the intensity of the re-entering illumination light calculated for all pixels constituting the target frame; calculating a difference between the sum calculated for the target frame, and a reference sum that is obtained by summing the intensity of the re-entering illumination light of each pixel constituting a reference frame image for all pixels and is calculated in advance by considering the gamma characteristic when the reference frame image set according to a gradation of each pixel constituting the target frame is displayed; and determining a correction amount to be added to or subtracted from a pixel value of each pixel constituting each frame in the video data by considering the gamma characteristic according to the difference.

BRIEF DESCRIPTION OF THE DRAWINGS

FIG. 8 is a diagram illustrating an example of a lookup table of a data converting unit in the projection display device according to one or more embodiments.

FIG. 10 is a flowchart illustrating operations performed by the projection display device according to one or more embodiments.

DETAILED DESCRIPTION

Figure 1:
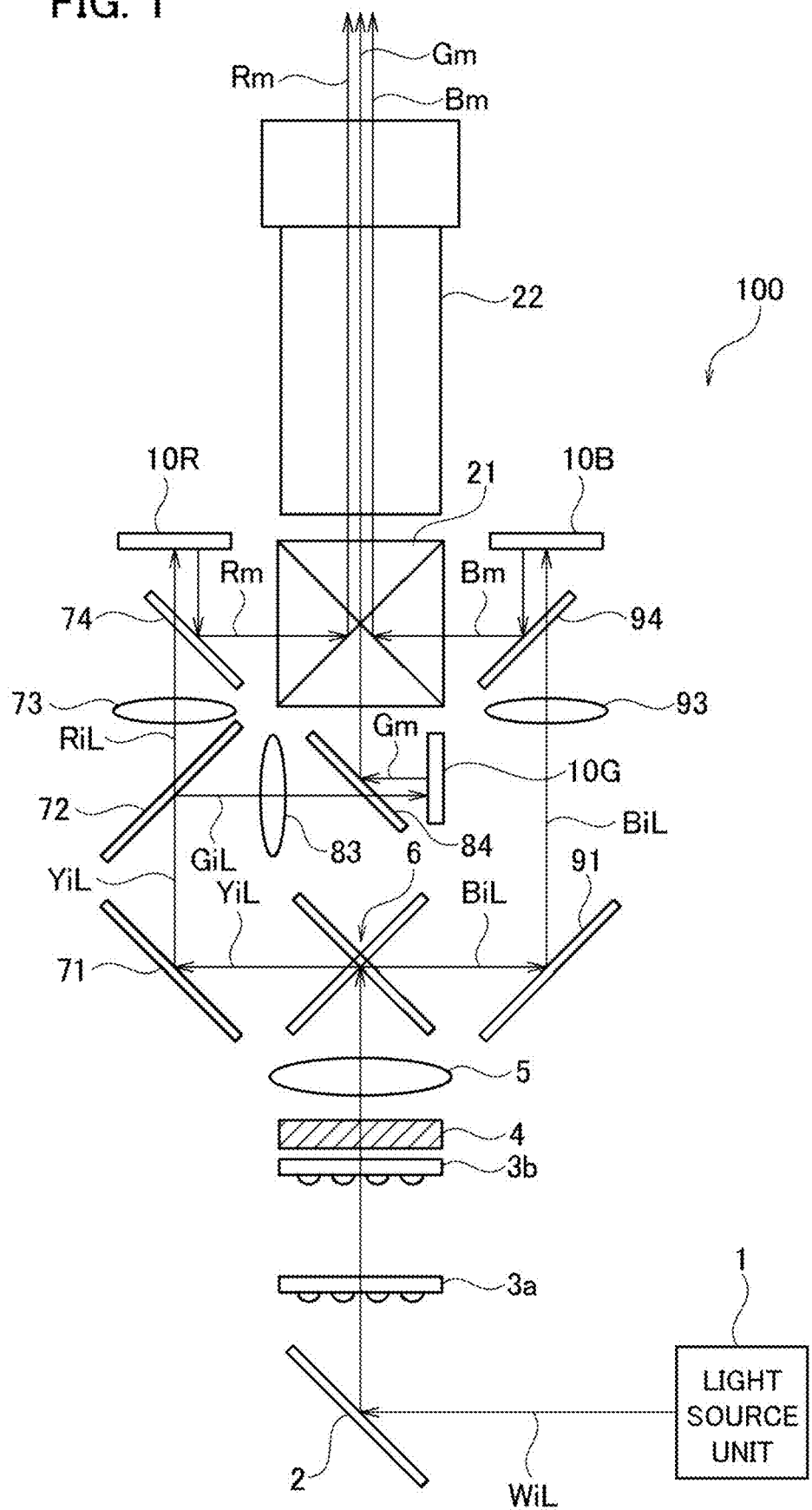
FIG. 1 is a diagram illustrating a projection display device according to one or more embodiments.
Figure 2:
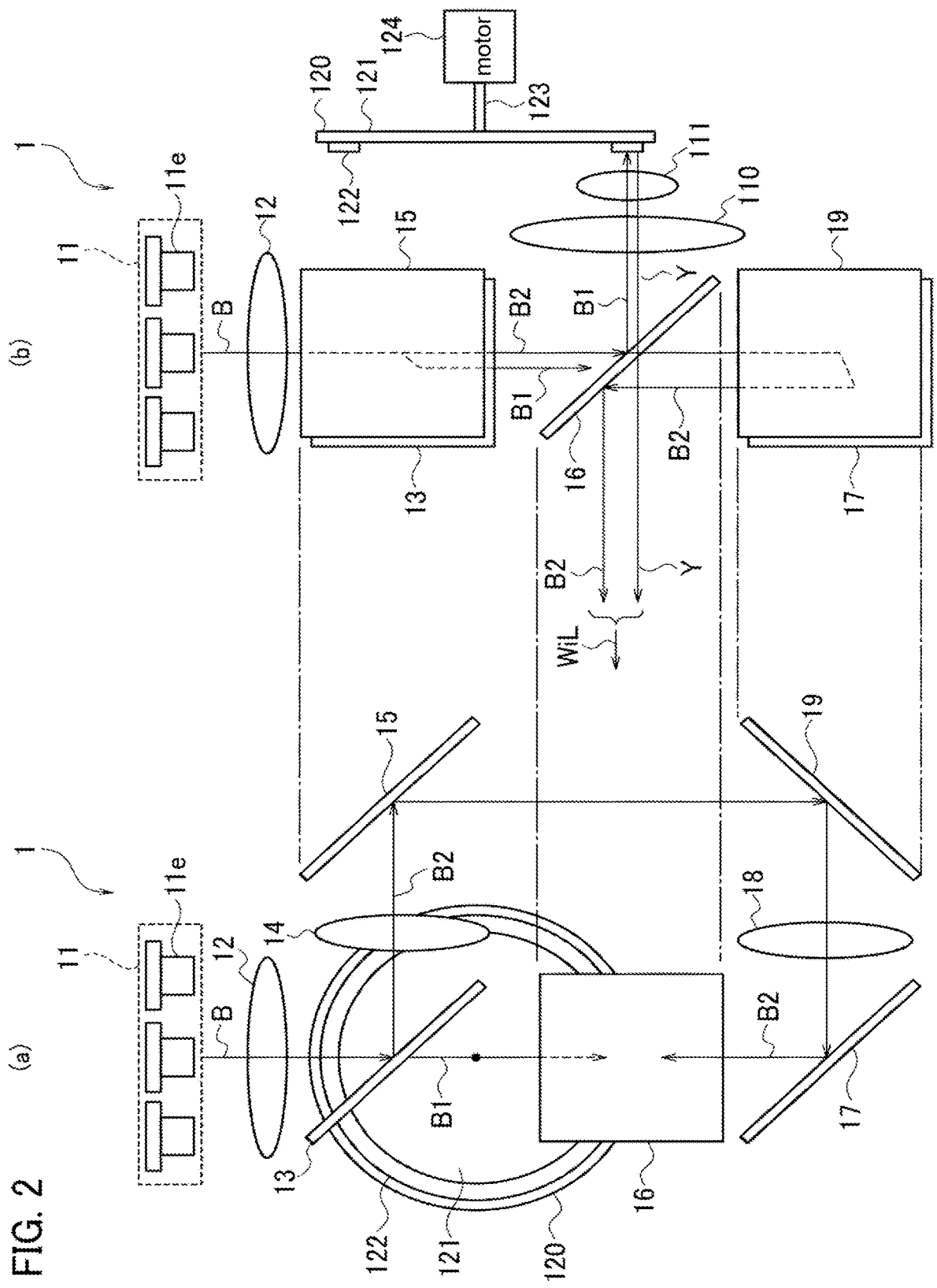
FIG. 2 is a plan view and a side view illustrating a detailed configuration of a light source unit of the projection display device according to one or more embodiments.

A projection display device and a video correction method according to one or more embodiments will be described below with reference to the accompanying diagrams. In FIG. 1, a projection display device 100 according to one or more embodiments includes a light source unit 1 emitting white illumination light WiL. The light source unit 1 is configured as shown in FIG. 2. In FIG. 2, R, G, B (B1 and B2), and Y indicate red light, green light, blue light, and yellow light, respectively.

In FIG. 2, the light source unit 1 includes a light source 11 including a plurality of blue laser elements 11e and a phosphor wheel 120. In FIG. 2, (a) is a front view of the light source unit 1, and (b) is a side view of the light source unit 1. Blue light emitted from the light source 11 is condensed by a condenser lens 12 and enters a division mirror 13. The division mirror 13 allows a portion (B1) of the entered blue light to pass therethrough and reflects a remaining portion (B2). The blue light (B2) reflected by the division mirror 13 is reflected by mirrors 15 and 19, condensed by a condenser lens 18, and reflected by a mirror 17.

The blue light (B2) reflected by the mirror 17 is reflected by a dichroic mirror 16. The dichroic mirror 16 has characteristics of reflecting blue light and allowing yellow light to pass therethrough.

The blue light (B1) which has passed through the division mirror 13 is reflected by the dichroic mirror 16, condensed by condenser lenses 110 and 111, and directed to the phosphor wheel 120. The phosphor wheel 120 is configured such that a specular disk 121 is rotated about a rotation shaft 123 by a motor 124. A phosphors 122 is applied to the vicinity of an outer peripheral end of the disk 121. The blue light condensed by the condenser lenses 110 and 111 enters the phosphor 122 and excites the phosphor 122, and the phosphor 122 emits yellow light including a red component and a green component.

The yellow light emitted by the phosphor 122 enters the dichroic mirror 16 through the condenser lenses 111 and 110. The dichroic mirror 16 allows the yellow light to pass therethrough. As described above, the blue light (B2) reflected by the dichroic mirror 16 and the yellow light that has passed through the dichroic mirror 16 are emitted from the light source unit 1 as the white illumination light WiL.

Returning to FIG. 1, the illumination light WiL emitted from the light source unit 1 is reflected by a mirror 2 and enters fly eye lenses 3a and 3b. Each optical element arranged from the mirror 2 to the front of a light modulation element 10R for red (for R), a light modulation element 10G for green (for G), and a light modulation element 10B for blue (for B), which will be described later, constitutes an illumination optical system. The light modulation element 10R for R, the light modulation element 10G for G, and the light modulation element 10B for B will be referred to as an R light modulation element 10R, a G light modulation element 10G, and a B light modulation element 10B, respectively. The R light modulation element 10R, the G light modulation element 10G, and the B light modulation element 10B may be collectively referred to as a light modulation element 10.

The R light modulation element 10R, the G light modulation element 10G, and the B light modulation element 10B are reflective liquid crystal display elements. That is, the R light modulation element 10R, the G light modulation element 10G, and the B light modulation element 10B are a reflective liquid crystal display element for red, a reflective liquid crystal display element for green, and a reflective liquid crystal display element for blue, respectively. The R light modulation element 10R, the G light modulation element 10G, and the B light modulation element 10B may be liquid crystal display elements generally referred to as Liquid Crystal On Silicon (LCOS) elements.

The fly eye lenses 3a and 3b uniformize the illumination distribution of the illumination light with which the R light modulation element 10R, the G light modulation element 10G, and the B light modulation element 10B are irradiated. The illumination light WiL emitted from the fly eye lens 3b enters a polarization conversion element 4. The polarization conversion element 4 aligns s-polarized light (first polarized light) and p-polarized light (second polarized light) included in the illumination light WiL with either the s-polarized light or the p-polarized light. As an example, the polarization conversion element 4 allow the s-polarized light to pass therethrough by a polarization beam splitter, converts the p-polarized light reflected by the polarization beam splitter into s-polarized light by a ½-wavelength plate, and emits the s-polarized light.

The s-polarized illumination light WiL emitted from the polarization conversion element 4 is condensed by a condenser lens 5 and enters a cross-dichroic mirror 6. The cross-dichroic mirror 6 separates the s-polarized illumination light WiL into yellow illumination light YiL and blue illumination light BiL.

The yellow illumination light YiL separated by the cross-dichroic mirror 6 enters a mirror 71, then is reflected by the mirror 71, and enters a dichroic mirror 72. The dichroic mirror 72 allow red illumination light RiL included in the yellow illumination light YiL to pass therethrough and reflects green illumination light GiL included in the yellow illumination light YiL. The red illumination light RiL is condensed by a condenser lens 73 and enters a reflective polarizing plate 74. The reflective polarizing plate 74 allow s-polarized light to pass therethrough and reflects p-polarized light. The reflective polarizing plate 74 and reflective polarizing plates 84 and 94, which will be described later, can be formed of wire grids.

The R light modulation element 10R generates and reflects red modulated light Rm obtained by modulating the s-polarized red illumination light RiL entered through the reflective polarizing plate 74 according to red data (R data) in a video data. The red modulated light Rm is p-polarized light, and the red modulated light Rm is reflected by the reflective polarizing plate 74 and enters a color synthesis prism 21.

The green illumination light GiL reflected by the dichroic mirror 72 is condensed by a condenser lens 83 and enters the reflective polarizing plate 84. The reflective polarizing plate 84 allow s-polarized light to pass therethrough and reflects p-polarized light. The G light modulation element 10G generates and reflects green modulated light Gm obtained by modulating the s-polarized green illumination light GiL entered through the reflective polarizing plate 84 according to green data (G data) in the video data. The green modulated light Gm is p-polarized light, and the green modulated light Gm is reflected by the reflective polarizing plate 84 and enters the color synthesis prism 21.

The blue illumination light BiL separated by the cross-dichroic mirror 6 enters a mirror 91 and is reflected by the mirror 91, and enters a condenser lens 93. The blue illumination light BiL is condensed by the condenser lens 93 and enters the reflective polarizing plate 94. The reflective polarizing plate 94 allow s-polarized light to pass therethrough and reflects p-polarized light.

The B light modulation element 10B generates and reflects blue modulated light Bm obtained by modulating the s-polarized blue illumination light BiL entered through the reflective polarizing plate 94 according to blue data (B data) in the video data. The blue modulated light Bm is p-polarized light, and the blue modulated light Bm is reflected by the reflective polarizing plate 94 and enters the color synthesis prism 21.

The color synthesis prism 21 synthesizes the red modulated light Rm, the green modulated light Gm, and the blue modulated light Bm, and generates a full-color image. A projection lens 22 projects the full-color image on an unillustrated screen.

Figure 3:
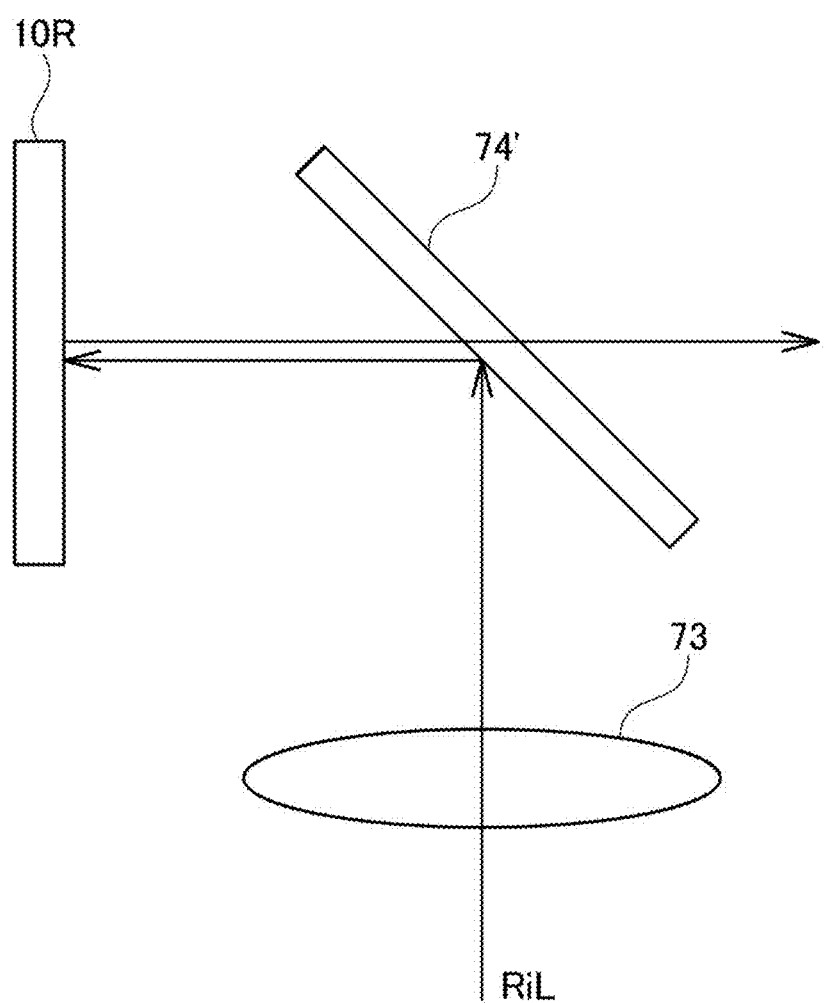
FIG. 3 is a diagram illustrating another type of reflective polarizing plate usable instead of a reflective polarizing plate shown in FIG. 1.

In the configuration example shown in FIG. 1, the reflective polarizing plate 74 is used which allows s-polarized light to pass therethrough and reflects p-polarized light, but as shown in FIG. 3, instead of the reflective polarizing plate 74, a reflective polarizing plate 74' may be used which reflects s-polarized light and allows p-polarized light to pass therethrough. The same applies to the reflective polarizing plates 84 and 94, and instead of using the reflective polarizing plates 84 and 94 which allow s-polarized light to pass therethrough and reflect p-polarized light, reflective polarizing plates may be used which reflect s-polarized light and allow p-polarized light to pass therethrough.

The projection display device 100 described above is a configuration example of a projection display device, the configuration of the light source unit 1 is not limited to the configuration shown in FIG. 2, and the configuration of the illumination optical system is not limited to the configuration shown in FIG. 1. The light source unit 1 may be constituted by a white lamp such as a mercury lamp. The projection display device 100 includes the R light modulation element 10R, G light modulation element 10G, and B light modulation element 10B, which are reflective liquid crystal display elements, and it is sufficient if the projection display device 100 is configured to generate a projection image by modulating the red illumination light RiL, green illumination light GiL, and blue illumination light BiL according to video data (R data, G data, and B data).

Among s-polarized light entering the light modulation element 10 of the projection display device 100, s-polarized light reflected without being modulate by the light modulation element 10 passes through the reflective polarizing plates 74, 84, and 94 and returns to a position closer to the light source unit 1 than the reflective polarizing plates 74, 84, and 94. The s-polarized light reflected without being modulated by the light modulation element 10 may return to the interior of the illumination optical system, may be reflected by optical elements such as the condenser lenses 73, 83, and 93 in the illumination optical system, and may re-enter the light modulation element 10. The s-polarized light reflected without being modulated by the light modulation element 10 may return to the light source unit 1, may be reflected thereby, and may re-enter the light modulation element 10.

If a color of an image to be displayed on a screen is black and pixel values of R data, G data, and B data are zero, s-polarized light entering the light modulation element 10 is not modulated by the light modulation element 10, and therefore most of the s-polarized light returns to a position closer to the light source unit 1. If a color of an image to be displayed on a screen is gray, a part of s-polarized light entering the light modulation element 10 is modulated by the light modulation element 10 and is directed to the projection lens 22, and a remaining part is not modulated by the light modulation element 10 and returns to a position closer to the light source unit 1. If a color of an image to be displayed on a screen is white and pixel values of R data, G data, and B data are maximum values, most of s-polarized light entering the light modulation element 10 is modulated by the light modulation element 10 and is directed to the projection lens 22.

In this way, how much of s-polarized light entering the light modulation element 10 passes through the reflective polarizing plates 74, 84, and 94 and returns to a position closer to the light source unit 1 than the reflective polarizing plates 74, 84, and 94, varies depending on an image to be displayed on a screen. Further, the intensity of re-entering illumination light varies depending on an image to be displayed on a screen, the re-entering illumination light being reflected by optical elements located at a position closer to the light source unit 1 than the reflective polarizing plates 74, 84, and 94 or the light source unit 1 and re-entering the light modulation element 10 through the reflective polarizing plates 74, 84, and 94.

Figure 4:
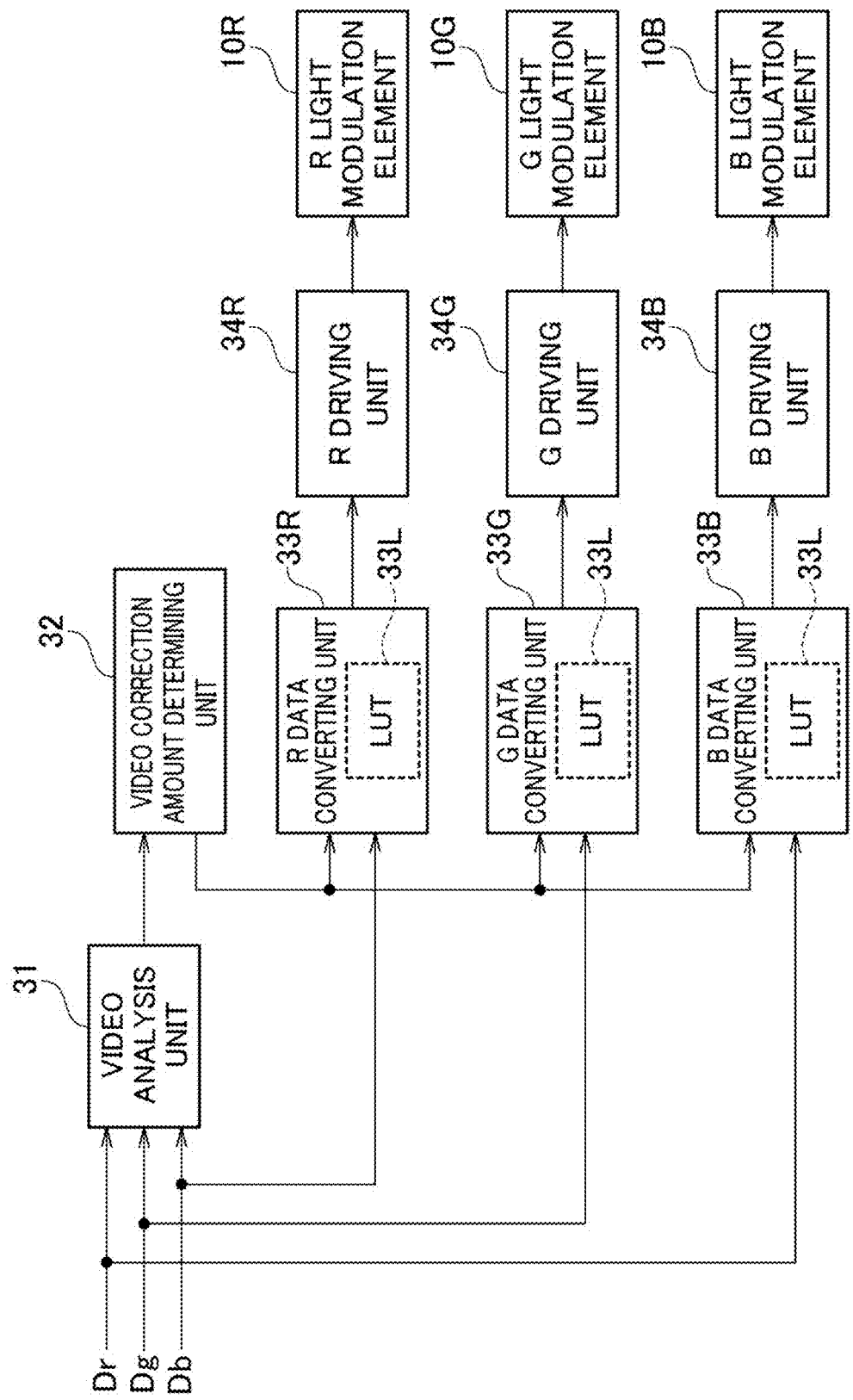
FIG. 4 is a block diagram illustrating a first configuration example of a video data input/element driving unit of the projection display device according to one or more embodiments.
Figure 5:
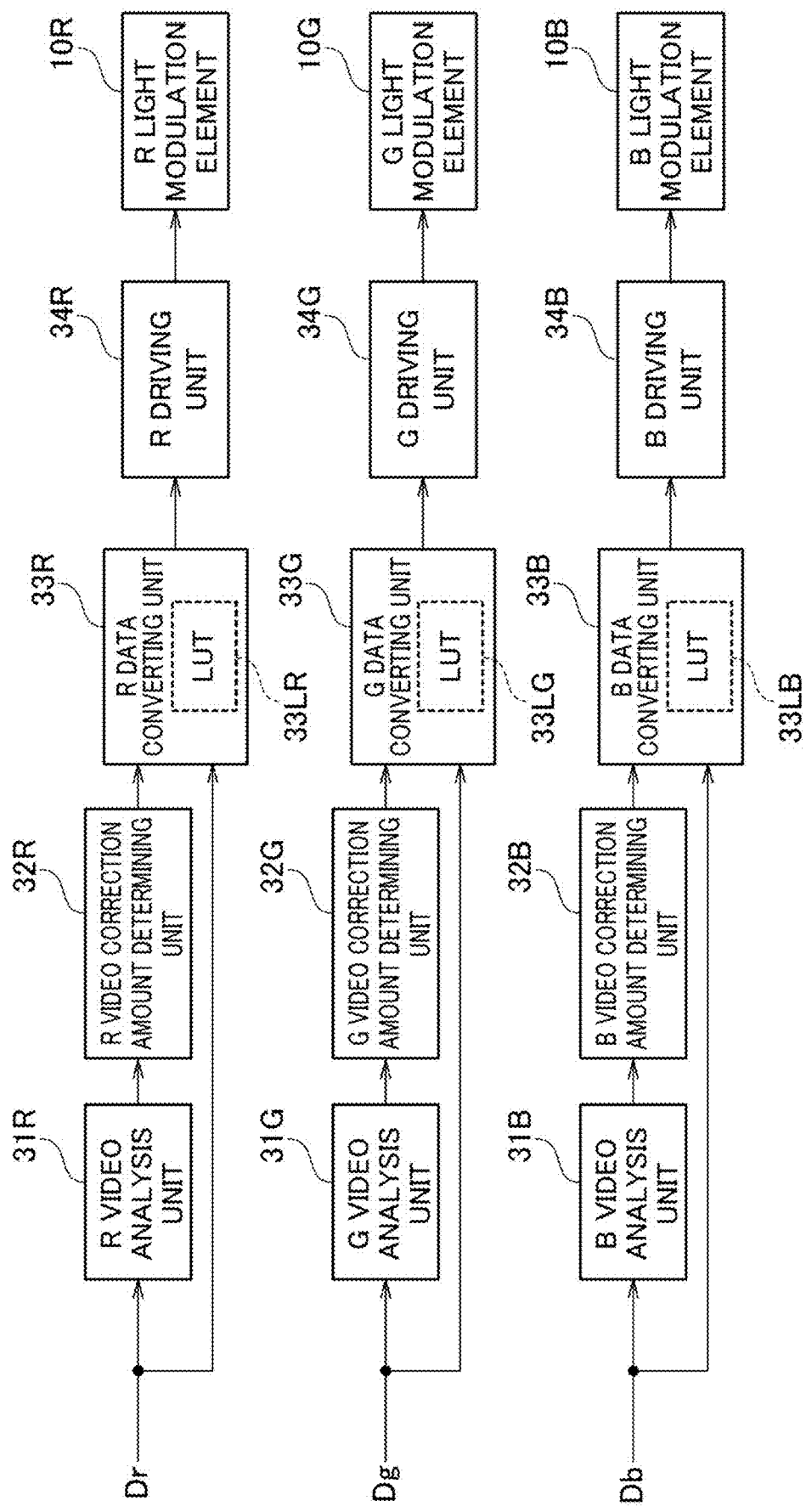
FIG. 5 is a block diagram illustrating a second configuration example of a video data input/element driving unit of the projection display device according to one or more embodiments.

The projection display device 100 includes a video data input/element driving unit which is shown in FIG. 4 or 5 but is not shown in FIG. 1. FIG. 4 is a first configuration example of a video data input/element driving unit, and FIG. 5 is a second configuration example of a video data input/element driving unit.

The first configuration example shown in FIG. 4 will be described. In FIG. 4, R data Dr, G data Dg, and B data Db constituting video data are input to a video analysis unit 31. By analyzing a video of a target frame, the video analysis unit 31 calculates the intensity of re-entering illumination light among s-polarized light entering the light modulation element 10, the re-entering illumination light being reflected by the light modulation element 10 without being modulated, returning to a position closer to the light source unit 1, being reflected by the optical elements in the illumination optical system or the light source unit 1, and re-entering the light modulation element 10. The target frame of which video is analyzed may be each frame constituting the video data, or one frame for every two or more frames.

The video analysis unit 31 calculates the intensity of the re-entering illumination light based on pixel values of all pixels constituting the target frame in the video data, and calculates a sum obtained by summing the intensity of the re-entering illumination light in the target frame. The video analysis unit 31 calculates a luminance value of each pixel in each frame based on a pixel value of each pixel in the R data Dr, a pixel value of each pixel in the G data Dg, and a pixel value of each pixel in the B data Db, and calculates the intensity of the re-entering illumination light and the sum.

Specifically, the video analysis unit 31 calculates the sum of the intensity of the re-entering illumination light as follows. The video analysis unit 31 calculates the intensity of the re-entering illumination light for each pixel constituting the target frame by considering a gamma characteristic of an output gradation relative to an input gradation of the reflective liquid crystal display elements (R light modulation element 10R, G light modulation element 10G, and B light modulation element 10B). The reasons why it is necessary to consider the gamma characteristic when the intensity of the re-entering illumination light is calculated are due to the following reasons.

An output gradation relative to an input gradation of a reflective liquid crystal display element is not linear, the element has a prescribed gamma characteristic, and therefore the amount of modulated light emitted from the reflective liquid crystal display element is not proportional to a pixel value. A case is exemplified in which video data is 8 bits and the element has a gamma characteristic called gamma 2.2. In this case, if a pixel value is zero, the amount of light emitted from the reflective liquid crystal display element relative to the amount of entering light is 0% from $(0/255)^{2.2}$, and the amount of returning light relative to the amount of entering light is 100%. If a pixel value is 64, the amount of light emitted from the reflective liquid crystal display element relative to the amount of entering light is about 5% from $(64/255)^{2.2}$, and the amount of returning light relative to the amount of entering light is about 95%.

If a pixel value is 128, the amount of light emitted from the reflective liquid crystal display element relative to the amount of entering light is about 22% from $(128/255)^{2.2}$, and the amount of returning light relative to the amount of entering light is about 78%. If a pixel value is 192, the amount of light emitted from the reflective liquid crystal display element relative to the amount of entering light is about 54% from $(192/255)^{2.2}$, and the amount of returning light relative to the amount of entering light is about 46%. If a pixel value is 255, the amount of light emitted from the reflective liquid crystal display element relative to the amount of entering light is 100% from $(255/255)^{2.2}$, and the amount of returning light relative to the amount of entering light is 0%. In this way, the amount of modulated light emitted from a reflective liquid crystal display element is not proportional to a pixel value, and therefore it is necessary to consider a gamma characteristic of a reflective liquid crystal display element when the intensity of re-entering illumination light is calculated.

After calculating the intensity of re-entering illumination light for each pixel constituting the target frame by considering the gamma characteristic, the video analysis unit 31 calculates a sum obtained by summing the intensity of re-entering illumination light calculated for all pixels constituting the target frame. The video analysis unit 31 supplies a sum calculated for each target frame to a video correction amount determining unit 32.

The video correction amount determining unit 32 stores a reference sum obtained by summing the intensity of re-entering illumination light of each pixel for all pixels when a reference frame image is displayed on a screen. The reference frame image is, for example, a projection image in which each pixel constituting the entire target frame has a uniform pixel value in each gradation from the minimum gradation to the maximum gradation. The reference sum of the reference frame image is calculated in advance by considering the gamma characteristic and is stored in the video correction amount determining unit 32. The video correction amount determining unit 32 selects a reference sum of a reference frame image according to a gradation of each pixel constituting the target frame.

The video correction amount determining unit 32 calculates a difference between the sum of the intensity of the re-entering illumination light calculated by the video analysis unit 31 and the reference sum. The video correction amount determining unit 32 determines a correction amount to be added to or subtracted from a pixel value of each pixel according to the calculated difference. At this time, the video correction amount determining unit 32 determines the correction amount considering the gamma characteristic. The video correction amount determining unit 32 may convert the difference into the correction amount based on a table or convert the difference into the correction amount based on a calculation formula. When the video analysis unit 31 calculates the sum of the intensity of the re-entering illumination light and the reference sum to be stored in the video correction amount determining unit 32 is calculated, a calculation formula for considering the gamma characteristic and a calculation formula for considering the gamma characteristic when the video correction amount determining unit 32 determines the correction amount have an inverse function relationship.

Operations performed by the video analysis unit 31 and the video correction amount determining unit 32 will be described specifically using numerical values. However, numerical values indicated here are numerical values for facilitating understanding and are different from actual numerical values. It is assumed that video data is 10 bits and a pixel value of a pixel of interest in a target frame is 500. At this time, it is assumed that a sum of the intensity of re-entering illumination light of the target frame is 1000. It is assumed that a reference sum of a reference frame image corresponding to the pixel value 500 is 700. In this case, the brightness of the pixel of interest is increased by the brightness corresponding to a difference 300 between the sum 1000 and the reference sum 700. The video correction amount determining unit 32 determines that a correction amount is −25, the correction amount being for darkening the brightness of the pixel of interest by the brightness corresponding to the difference 300. That is, if a pixel value of the pixel of interest is 475, the brightness of the pixel of interest is the same as that of a pixel at the same position in a reference frame image.

Figure 7A:
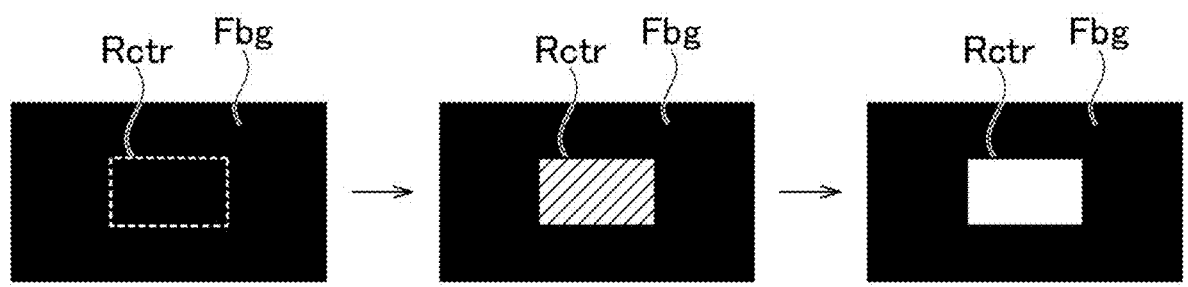
FIG. 7A is a diagram illustrating a projection image in which the background of a frame is black and the gradation of a central region changes from the minimum gradation to the maximum gradation.
Figure 7B:
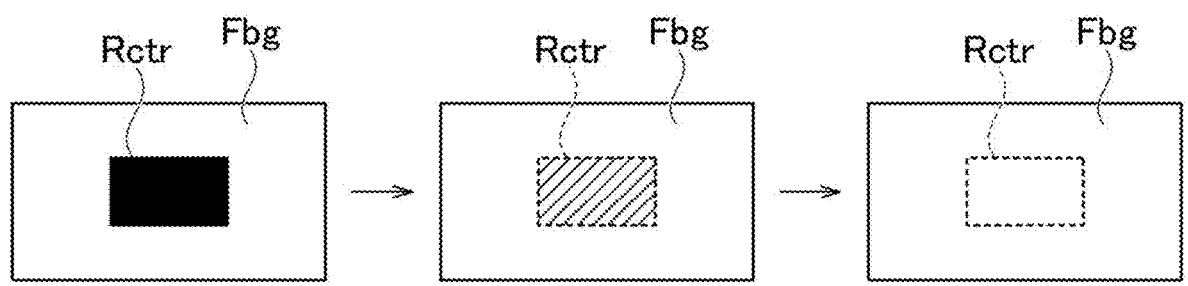
FIG. 7B is a diagram illustrating a projection image in which the background of a frame is white and the gradation of a central region changes from the minimum gradation to the maximum gradation.

A reference frame image is not limited to a projection image in which an entire frame has uniform pixel values. As shown in FIG. 7A, which will be described later, there is an image in which a background Fbg of a frame is always black (gradation 0) and a prescribed pattern is displayed in a central region Rctr. Further, as shown in FIG. 7B, there is an image in which a background Fbg of a frame is always white (gradation 1023) and a prescribed pattern is displayed in a central region Rctr.

In a case where the projection display device 100 displays an image in which a part of a region in a frame is fixed to a specific gradation, it is not necessary for a reference frame image to be a projection image in which an entire frame has uniform pixel values. It is sufficient if a reference frame image is a projection image in which, while a part of a region in a frame is fixed to a specific gradation, each pixel constituting a remaining region (central region Rctr in FIGS. 7A and 7B) for displaying a prescribed pattern has a uniform pixel value in each gradation from the minimum gradation to the maximum gradation. What type of frame image is set as a reference frame image may be determined as a matter of design.

The video correction amount determining unit 32 may determine a correction amount to be added to or subtracted from a pixel value of each pixel, if the sum of the intensity of the re-entering illumination light calculated by the video analysis unit 31 changes to be a prescribed threshold value or more. That is, the video correction amount determining unit 32 may maintain the latest correction amount if the sum does not change to be the prescribed threshold value or more.

With reference to a characteristic diagram shown in FIG. 6, how the display luminance of a projection image changes according to a pattern of a frame will be described. A solid line shown in FIG. 6 indicates the reference luminance of a projection image when the gradation of all pixels of a frame changes from the gradation 0 as the minimum gradation to the gradation 1023 as the maximum gradation, while assuming that video data is 10 bits. A dashed line shown in FIG. 6 indicates the display luminance in the central region Rctr of the projection image when the background Fbg of the frame is always black, and the gradation of the central region Rctr changes from the gradation 0 to the gradation 1023, as shown in FIG. 7A. A dash-dot-dash line shown in FIG. 6 indicates the display luminance in the central region Rctr of the projection image when the background Fbg of the frame is always white (gradation 1023) and the gradation of the central region Rctr changes from gradation 0 to gradation 1023, as shown in FIG. 7B.

In FIGS. 7A and 7B, the region Rctr shown with hatching indicates a gray region.

Figure 6:
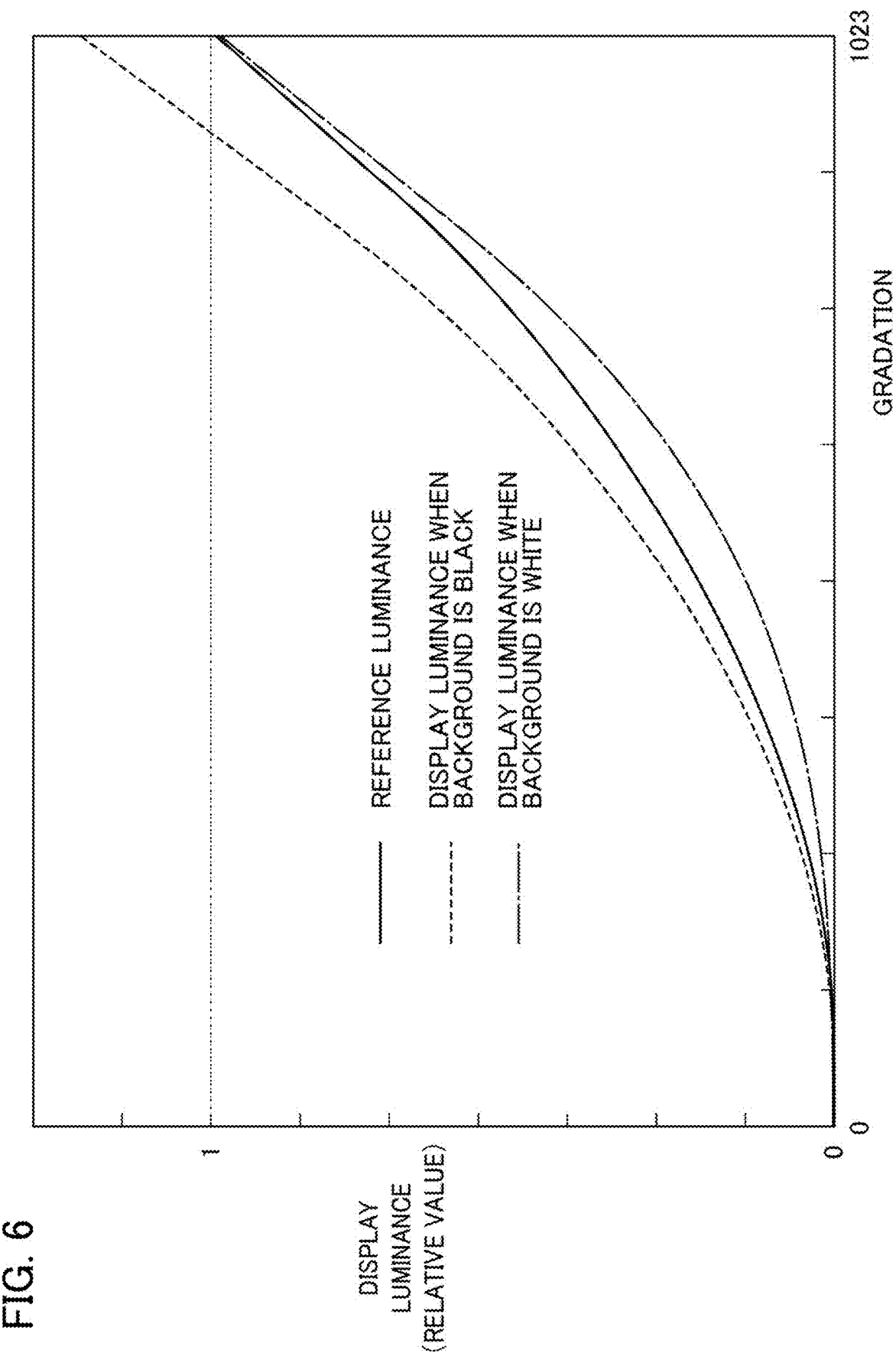
FIG. 6 is a characteristic diagram illustrating the reference luminance which is the display luminance of a projection image when the gradation of all pixels of a frame changes from the minimum gradation to the maximum gradation, the display luminance when a background of a frame is black and the gradation of a central region changes from the minimum gradation to the maximum gradation, and the display luminance when a background of a frame is white and the gradation of a central region changes from the minimum gradation to the maximum gradation.

If the background Fbg of the frame shown in FIG. 7A is black, the display luminance in the region Rctr of the projection image is higher than the reference luminance, as shown in FIG. 6, because the luminance is largely affected by the re-entering illumination light due to the background Fbg being black. If the background Fbg of the frame shown in FIG. 7B is white, the display luminance in the region Rctr of the projection image is lower than the reference luminance, because the luminance is hardly affected by the re-entering illumination light due to the background Fbg being white. As can be seen from FIG. 6, the display luminance of each pixel in a frame of a projection image varies according to pixel values of surrounding pixels. The amount of change in the display luminance caused by re-entering of illumination light is not constant in all gradations of video data, but the amount of change depends on the gradation.

A correction amount determined by the video correction amount determining unit 32 is an addition/subtraction value for correcting the display luminance deviated from the reference luminance indicated by the dashed line or dash-dot-dash shown in FIG. 6 to the reference luminance for each gradation. The video correction amount determining unit 32 supplies the determined correction amount for each gradation to a red data converting unit (R data converting unit) 33R, a green data converting unit (G data converting unit) 33G, and a blue data converting unit (B data converting unit) 33B. In the first configuration example shown in FIG. 4, a correction amount for each gradation is common to the R data Dr, G data Dg, and B data Db.

The R data converting unit 33R, G data converting unit 33G, and B data converting unit 33B generate a lookup table 33L of which input value is a pixel value of each of the R data Dr, G data Dg, and B data Db from the gradation 0 to the gradation 1023, and of which output value is a value obtained by adding or subtracting, to or from each input value, a correction amount for each gradation supplied from the video correction amount determining unit 32. The R data converting unit 33R, G data converting unit 33G, and B data converting unit 33B update the lookup table 33L each time the video correction amount determining unit 32 supplies a correction amount determined in a target frame to the R data converting unit 33R, G data converting unit 33G, and B data converting unit 33B.

The R data converting unit 33R, G data converting unit 33G, and B data converting unit 33B convert a pixel value of each frame in the R data Dr, G data Dg, and B data Db from the gradation 0 to the gradation 1023 using the lookup table 33L that may be updated as time progresses. The timing of a frame in which the video analysis unit 31 analyzes a video and the video correction amount determining unit 32 determines a correction amount, and the timing of a frame in which the R data converting unit 33R, G data converting unit 33G, and B data converting unit 33B convert pixel values, need to match each other. In order to match the timing of both of the frames, the R data Dr, G data Dg, and B data Db are delayed as necessary and are supplied to the R data converting unit 33R, G data converting unit 33G, and B data converting unit 33B.

If the target frame is used as each frame and a pattern of a frame changes for every frame, the R data converting unit 33R, G data converting unit 33G, and B data converting unit 33B convert a pixel value of each frame in the R data Dr, G data Dg, and B data Db using the lookup table 33L updated for every frame. If the target frame is used as one frame for every two frames and a pattern of a frame changes for every frame, the R data converting unit 33R, G data converting unit 33G, and B data converting unit 33B convert a pixel value of each frame in the R data Dr, G data Dg, and B data Db using the lookup table 33L updated for every two frames.

In FIG. 8, a lookup table 33L shown in (a), input values from a pixel value 0 to a pixel value 1023 are used as output values from a pixel value 0 to a pixel value 1023 without any changes. In the lookup table 33L shown in (a) of FIG. 8, a correction amount is 0 from the pixel value 0 to the pixel value 1023. The correction amount is shown for facilitating understanding.

In FIG. 8, a lookup table 33L shown in (b), input values of pixel values 2, 3, 4, 5, . . . , 1019, 1020, 1021, 1022, and 1023 are converted into output values of pixel values 1, 2, 2, 3, . . . , 971, 971, 972, 972, and 973, respectively. Correction amounts at this time are −1, −1, −2, −2, . . . , −48, −49, −49, −50, and −50. The lookup table 33L shown in (b) of FIG. 8 is a table for correcting, to the reference luminance, the display luminance of the projection image which becomes higher than the reference luminance, as shown by the dashed line in FIG. 6.

In FIG. 8, a lookup table 33L shown in (c), input values of pixel values 0, 1, 2, 3, 4, 5, . . . , 1019, 1020, 1021, 1022, and 1023 are converted into output values of pixel values 50, 51, 51, 52, 52, 53, . . . , 1021, 1021, 1022, 1022, and 1023, respectively. Correction amounts at this time are +50, +50, +49, +49, +48, +48, . . . , +2, +1, +1, 0, and 0. The lookup table 33L shown in (c) of FIG. 8 is a table for correcting, to the reference luminance, the display luminance of the projection image which becomes lower than the reference luminance, as shown by the dash-dot-dash line in FIG. 6.

In FIG. 8, a lookup table 33L shown in (d), input values of pixel values 0, 1, 2, 3, 4, 5, . . . , 1019, 1020, 1021, 1022, and 1023 are converted into output values of pixel values 25, 26, 26, 27, 27, 28, . . . , 996, 996, 997, 997, and 998, respectively. Correction amounts at this time are +25, +25, +24, +24, +23, +23, . . . , −23, −24, −24, −25, and −25. The lookup table 33L shown in (d) of FIG. 8 is a table for correcting, to the reference luminance, the display luminance of the projection image, which becomes lower than the reference luminance in a low-gradation region and higher than the reference luminance in a high-gradation region.

In the lookup table 33L, the input value of the pixel value 0 may always be fixed to the output value of the pixel value 0. This can suppress the black floating of an image displayed on a screen. If the projection display device 100 can display an image with high contrast, the input value of the pixel value 0 may always be fixed to the output value of the pixel value 0. Alternatively, if the projection display device 100 may not display an image with high contrast, the input value of the pixel value 0 may be corrected.

Returning to FIG. 4, a red driving unit (R driving unit) 34R drives the R light modulation element 10R to display each frame in the R data Dr according to a pixel value converted by the R data converting unit 33R. A green driving unit (G driving unit) 34G drives the G light modulation element 10G to display each frame in the G data Dg according to a pixel value converted by the G data converting unit 33G. A blue driving unit (B driving unit) 34B drives the B light modulation element 10B to display each frame in the B data Db according to a pixel value converted by the B data converting unit 33B.

According to the first configuration example of the video data input/element driving unit shown in FIG. 4, it is possible to appropriately correct a change in the display luminance caused by re-entering of illumination light to the R light modulation element 10R, G light modulation element 10G, and B light modulation element 10B.

The second configuration example shown in FIG. 5 will be described. In FIG. 5, a description of matters common to those in FIG. 4 may be omitted. In FIG. 5, a red video analysis unit (R video analysis unit) 31R calculates the intensity of re-entering illumination light based on pixel values of all pixels constituting a target frame in the R data Dr, and calculates a sum obtained by summing the intensity of the re-entering illumination light in the target frame. A green video analysis unit (G video analysis unit) 31G calculates the intensity of re-entering illumination light based on pixel values of all pixels constituting a target frame in the G data Dg, and calculates a sum obtained by summing the intensity of the re-entering illumination light in the target frame. A blue video analysis unit (B video analysis unit) 31B calculates the intensity of re-entering illumination light based on pixel values of all pixels constituting a target frame in the B data Db, and calculates a sum obtained by summing the intensity of the re-entering illumination light in the target frame.

A red video correction amount determining unit (R video correction amount determining unit) 32R stores a reference sum obtained by summing the intensity of re-entering illumination light of each pixel for all pixels when a red reference frame image is displayed on a screen. The red reference frame image is, for example, a projection image in which each pixel constituting an entire target frame has a uniform pixel value in each gradation from the minimum red gradation to the maximum red gradation. The reference sum of the red reference frame image is calculated in advance by considering the gamma characteristic and is stored in the R video correction amount determining unit 32R. The R video correction amount determining unit 32R selects a reference sum of a red reference frame image according to a gradation of each pixel constituting a target frame in the R data Dr.

The R video correction amount determining unit 32R determines a correction amount to be added to or subtracted from to a pixel value of each pixel according to a difference between the sum of the intensity of the re-entering illumination light in the R data Dr calculated by the R video analysis unit 31R and the reference sum of the red reference frame image. At this time, the R video correction amount determining unit 32R determines a correction amount considering the gamma characteristic. The R video correction amount determining unit 32R may convert the difference into a correction amount based on a table or convert the difference into a correction amount based on a calculation formula.

A green video correction amount determining unit (G video correction amount determining unit) 32G stores a reference sum obtained by summing the intensity of re-entering illumination light of each pixel for all pixels when a green reference frame image is displayed on a screen. The green reference frame image is, for example, a projection image in which each pixel constituting an entire target frame has a uniform pixel value in each gradation from the minimum green gradation to the maximum green gradation. The reference sum of the green reference frame image is calculated in advance by considering the gamma characteristic and is stored in the G video correction amount determining unit 32G. The G video correction amount determining unit 32G selects a reference sum of a green reference frame image according to a gradation of each pixel constituting a target frame in the G data Dg.

The G video correction amount determining unit 32G determines a correction amount to be added to or subtracted from a pixel value of each pixel according to a difference between the sum of the intensity of the re-entering illumination light in the G data Dg calculated by the G video analysis unit 31G and the reference sum of the green reference frame image. At this time, the G video correction amount determining unit 32G determines a correction amount considering the gamma characteristic. The G video correction amount determining unit 32G may convert the difference into a correction amount based on a table or convert the difference into a correction amount based on a calculation formula.

A blue video correction amount determining unit (B video correction amount determining unit) 32B stores a reference sum obtained by summing the intensity of re-entering illumination light of each pixel for all pixels when a blue reference frame image is displayed on a screen. The blue reference frame image is, for example, a projection image in which each pixel constituting an entire target frame has a uniform pixel value in each gradation from the minimum blue gradation to the maximum blue gradation. The reference sum of the blue reference frame image is calculated in advance by considering the gamma characteristic and is stored in the B video correction amount determining unit 32B. The B video correction amount determining unit 32B selects a reference sum of a blue reference frame image according to a gradation of each pixel constituting a target frame in the B data Db.

The B video correction amount determining unit 32B determines a correction amount to be added to or subtracted from to a pixel value of each pixel according to a difference between the sum of the intensity of the re-entering illumination light in the B data Db calculated by the B video analysis unit 31B and the reference sum of the blue reference frame image. At this time, the B video correction amount determining unit 32B determines a correction amount considering the gamma characteristic. The B video correction amount determining unit 32B may convert the difference into a correction amount based on a table or convert the difference into a correction amount based on a calculation formula.

As in the case of the first configuration example, the red reference frame image, the green reference frame image, and the blue reference frame image are not limited to a projection image in which an entire target frame has uniform pixel values in each gradation.

The R video correction amount determining unit 32R, G video correction amount determining unit 32G, and B video correction amount determining unit 32B supply a determined correction amount for each gradation to the R data converting unit 33R, G data converting unit 33G, and B data converting unit 33B, respectively. In the second configuration example shown in FIG. 5, a correction amount for each gradation is different for each of the R data Dr, G data Dg, and B data Db.

The R data converting unit 33R generates a lookup table 33LR of which input value is a pixel value of the R data Dr from the gradation 0 to the gradation 1023, and of which output value is a value obtained by adding or subtracting, to or from each input value, a correction amount for each gradation supplied from the R video correction amount determining unit 32R. The G data converting unit 33G generates a lookup table 33LG of which input value is a pixel value of the G data Dg from the gradation 0 to the gradation 1023, and of which output value is a value obtained by adding or subtracting, to or from each input value, a correction amount for each gradation supplied from the G video correction amount determining unit 32G. The B data converting unit 33B generates a lookup table 33LB of which input value is a pixel value of the B data Db from the gradation 0 to the gradation 1023, and of which output value is a value obtained by adding or subtracting, to or from each input value, a correction amount for each gradation supplied from the B video correction amount determining unit 32B.

The R data converting unit 33R, G data converting unit 33G, and B data converting unit 33B update the lookup tables 33LR, 33LG, and 33LB each time the R video correction amount determining unit 32R, G video correction amount determining unit 32G, and B video correction amount determining unit 32B supply a correction amount determined in a target frame to the R data converting unit 33R, G data converting unit 33G, and B data converting unit 33B. The lookup tables 33LR, 33LG, and 33LB are similar to the lookup table 33L shown in FIG. 8, but are separately set for the R data converting unit 33R, G data converting unit 33G, and B data converting unit 33B, respectively.

The R data converting unit 33R, G data converting unit 33G, and B data converting unit 33B use the lookup tables 33LR, 33LG, and 33LB, respectively, to convert pixel values of each frame in the R data Dr, G data Dg, and B data Db from the gradation 0 to the gradation 1023.

The R driving unit 34R drives the R light modulation element 10R to display each frame in the R data Dr according to a pixel value converted by the R data converting unit 33R. The G driving unit 34G drives the G light modulation element 10G to display each frame in the G data Dg according to a pixel value converted by the G data converting unit 33G. The B driving unit 34B drives the B light modulation element 10B to display each frame in the B data Db according to a pixel value converted by the B data converting unit 33B.

According to the second configuration example of the video data input/element driving unit shown in FIG. 5, it is possible to appropriately correct a change in the display luminance caused by re-entering of illumination light to the R light modulation element 10R, G light modulation element 10G, and B light modulation element 10B. Further, according to the second configuration example of the video data input/element driving unit shown in FIG. 5, it is possible to correct the color balance by using the lookup tables 33LR, 33LG, and 33LB that are different from each other.

A ratio between the intensity of s-polarized light reflected without being modulate by the light modulation element 10, the s-polarized light returning to the interior of the illumination optical system, being reflected by optical elements in the illumination optical system, and re-entering the light modulation element 10, and the intensity of s-polarized light returning to the light source unit 1, being reflected thereby, and re-entering the light modulation element 10 can be determined in advance by performing an experiment. The irradiation intensity of illumination light with which the light modulation element 10 is irradiated is not uniform in a surface of the light modulation element 10, and the irradiation intensity is lower toward left and right ends in a horizontal direction and is lower toward upper and lower ends in a vertical direction, as shown in FIGS. 9A and 9B.

Figure 9A:
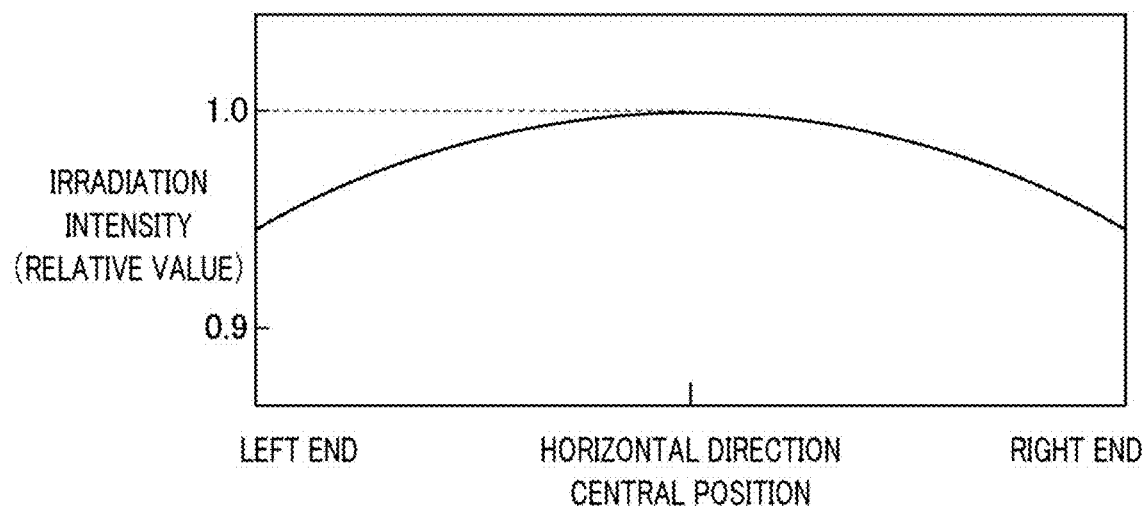
FIG. 9A is a characteristic diagram illustrating the irradiation intensity in a horizontal direction of illumination light with which a light modulation element is irradiated.
Figure 9B:
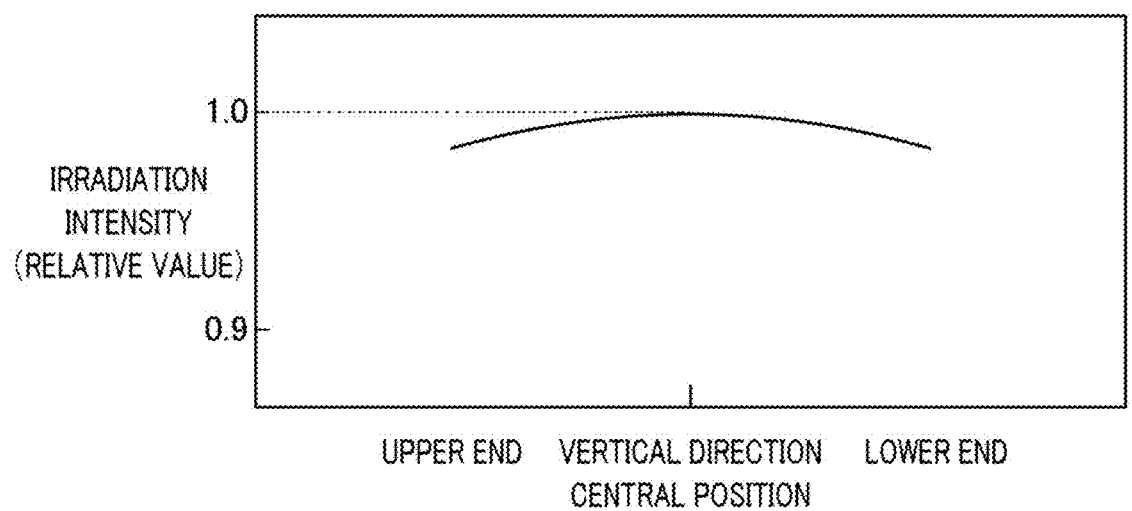
FIG. 9B is a characteristic diagram illustrating the irradiation intensity in a vertical direction of the illumination light with which the light modulation element is irradiated.

If the s-polarized light reflected without being modulate by the light modulation element 10 returns to the light source unit 1, is reflected thereby, and re-enters the light modulation element 10, the influence of a characteristic of the irradiation intensity shown in FIGS. 9A and 9B is not received. This is because the characteristic of the irradiation intensity is offset due to the light returning to the light source unit 1 and re-entering. If the s-polarized light reflected without being modulate by the light modulation element 10 is reflected by the optical elements in the illumination optical system and re-enters the light modulation element 10, the influence of a characteristic of the irradiation intensity shown in FIGS. 9A and 9B is received.

Therefore, it is preferable for the video analysis unit 31, R video analysis unit 31R, G video analysis unit 31G, and B video analysis unit 31B to calculate the intensity of the s-polarized light which is reflected by the optical elements in the illumination optical system and re-enters the light modulation element 10 by considering the irradiation intensity of the s-polarized light entering the light modulation element 10 at each position in the horizontal direction and the vertical direction.

With reference to a flowchart shown in FIG. 10, a description will be given regarding operations performed by the projection display device 100 and a video correction method performed by the projection display device 100 (video data input/element driving unit). In FIG. 10, each frame is a target frame. In FIG. 10, after video data is input to the projection display device 100 and processing starts, in step S1, the video analysis unit 31, R video analysis unit 31R, G video analysis unit 31G, and B video analysis unit 31B calculate a sum of the intensity of re-entering illumination light based on pixel values of all pixels in a frame. In step S2, the video correction amount determining unit 32, R video correction amount determining unit 32R, G video correction amount determining unit 32G, and B video correction amount determining unit 32B determine a correction amount in each gradation that can correct the display luminance of a projection image to the reference luminance.

In step S3, the R data converting unit 33R, G data converting unit 33G, and B data converting unit 33B update the lookup tables 33L, 33LR, 33LG, and 33LB. In step S4, the R data converting unit 33R, G data converting unit 33G, and B data converting unit 33B convert a pixel value of video data from the minimum gradation to the maximum gradation by using the updated lookup tables 33L, 33LR, 33LG, and 33LB.

In step S5, the R driving unit 34R, G driving unit 34G, and B driving unit 34B drive the R light modulation element 10R, G light modulation element 10G, and B light modulation element 10B, respectively, based on the converted pixel value. In step S6, the video analysis unit 31, R video analysis unit 31R, G video analysis unit 31G, and B video analysis unit 31B determine whether a next frame is input. If the next frame is input (YES), the processing of steps S1 to S6 is repeated. Alternatively, if the next frame is not input (NO), the projection display device 100 ends the processing.

The present invention is not limited to one or more embodiments described above, and various modifications are possible within a scope not departing from a scope of the present invention.

What is claimed is:

1. A projection display device comprising:
    a video analysis unit configured to calculate an intensity of re-entering illumination light that is first polarized light, among first polarized light entering a reflective liquid crystal display element through a polarizing plate which is included in illumination light having the first polarized light and second polarized light, for each pixel constituting a target frame of which video is analyzed in video data displayed on the reflective liquid crystal display element, by considering a gamma characteristic of an output gradation relative to an input gradation of the reflective liquid crystal display element, the first polarized light being reflected by the reflective liquid crystal display element without being modulated by the reflective liquid crystal display element, returning to a position closer to a light source unit than the polarizing plate, being reflected by an optical element located at a position closer to the light source unit than the polarizing plate or by the light source unit, and re-entering the reflective liquid crystal display element through the polarizing plate, and is configured to calculate a sum obtained by summing the intensity of the re-entering illumination light calculated for all pixels constituting the target frame; and
    a video correction amount determining unit configured to determine a correction amount to be added to or subtracted from a pixel value of each pixel constituting each frame in the video data by considering the gamma characteristic according to a difference between the sum calculated for the target frame by the video analysis unit, and a reference sum that is obtained by summing the intensity of the re-entering illumination light of each pixel constituting a reference frame image for all pixels and is calculated in advance by considering the gamma characteristic when the reference frame image set according to a gradation of each pixel constituting the target frame is displayed.

2. The projection display device according to claim 1, wherein
    the video correction amount determining unit uses a projection image corresponding to each gradation from a minimum gradation to a maximum gradation of each pixel constituting the target frame as the reference frame image, and determines the correction amount for each gradation from the minimum gradation to the maximum gradation.

3. The projection display device according to claim 2, further comprising:
    a data converting unit configured to convert a pixel value of each pixel constituting each frame in the video data using a table in which an input value is each pixel value of each pixel constituting each frame in the video data from the minimum gradation to the maximum gradation and an output value is a pixel value obtained by adding or subtracting, to or from each pixel value from the minimum gradation to the maximum gradation, the correction amount for each gradation from the minimum gradation to the maximum gradation.

4. The projection display device according to claim 1, wherein
    the video analysis unit calculates an intensity of the first polarized light that is reflected by the optical element and re-enters the reflective liquid crystal display element through the polarizing plate, for each pixel constituting the target frame by considering an irradiation intensity of the first polarized light that enters the reflective liquid crystal display element at each position in a horizontal direction and a vertical direction of the reflective liquid crystal display element.

5. A projection display device comprising:
    a red video analysis unit configured to calculate an intensity of re-entering illumination light that is first polarized light, among first polarized light entering a reflective liquid crystal display element for red through a polarizing plate which is included in illumination light having the first polarized light and second polarized light, for each pixel constituting a target frame of which video is analyzed in red data displayed on the reflective liquid crystal display element for red, by considering a gamma characteristic of an output gradation relative to an input gradation of the reflective liquid crystal display element for red, the first polarized light being reflected by the reflective liquid crystal display element for red without being modulated by the reflective liquid crystal display element for red, returning to a position closer to a light source unit than the polarizing plate, being reflected by an optical element located at a position closer to the light source unit than the polarizing plate or by the light source unit, and re-entering the reflective liquid crystal display element for red through the polarizing plate, and is configured to calculate a sum obtained by summing the intensity of the re-entering illumination light calculated for all pixels constituting the target frame;
    a green video analysis unit configured to calculate an intensity of re-entering illumination light that is first polarized light, among first polarized light entering a reflective liquid crystal display element for green through a polarizing plate which is included in illumination light having the first polarized light and second polarized light, for each pixel constituting a target frame of which video is analyzed in green data displayed on the reflective liquid crystal display element for green, by considering a gamma characteristic of an output gradation relative to an input gradation of the reflective liquid crystal display element for green, the first polarized light being reflected by the reflective liquid crystal display element for green without being modulated by the reflective liquid crystal display element for green, returning to a position closer to a light source unit than the polarizing plate, being reflected by an optical element located at a position closer to the light source unit than the polarizing plate or by the light source unit, and re-entering the reflective liquid crystal display element for green through the polarizing plate, and is configured to calculate a sum obtained by summing the intensity of the re-entering illumination light calculated for all pixels constituting the target frame;

a blue video analysis unit configured to calculate an intensity of re-entering illumination light that is first polarized light, among first polarized light entering a reflective liquid crystal display element for blue through a polarizing plate which is included in illumination light having the first polarized light and second polarized light, for each pixel constituting a target frame of which video is analyzed in blue data displayed on the reflective liquid crystal display element for blue, by considering a gamma characteristic of an output gradation relative to an input gradation of the reflective liquid crystal display element for blue, the first polarized light being reflected by the reflective liquid crystal display element for blue without being modulated by the reflective liquid crystal display element for blue, returning to a position closer to a light source unit than the polarizing plate, being reflected by an optical element located at a position closer to the light source unit than the polarizing plate or by the light source unit, and re-entering the reflective liquid crystal display element for blue through the polarizing plate, and is configured to calculate a sum obtained by summing the intensity of the re-entering illumination light calculated for all pixels constituting the target frame;

a red video correction amount determining unit configured to determine a correction amount to be added to or subtracted from a pixel value of each pixel constituting each frame in the red data by considering the gamma characteristic according to a difference between the sum calculated for the target frame by the red video analysis unit, and a reference sum that is obtained by summing the intensity of the re-entering illumination light of each pixel constituting a red reference frame image for all pixels and is calculated in advance by considering the gamma characteristic when the red reference frame image set according to a gradation of each pixel constituting the target frame is displayed;

a green video correction amount determining unit configured to determine a correction amount to be added to or subtracted from a pixel value of each pixel constituting each frame in the green data by considering the gamma characteristic according to a difference between the sum calculated for the target frame by the green video analysis unit, and a reference sum that is obtained by summing the intensity of the re-entering illumination light of each pixel constituting a green reference frame image for all pixels and is calculated in advance by considering the gamma characteristic when the green reference frame image set according to a gradation of each pixel constituting the target frame is displayed; and a blue video correction amount determining unit configured to determine a correction amount to be added to or subtracted from a pixel value of each pixel constituting each frame in the blue data by considering the gamma characteristic according to a difference between the sum calculated for the target frame by the blue video analysis unit, and a reference sum that is obtained by summing the intensity of the re-entering illumination light of each pixel constituting a blue reference frame image for all pixels and is calculated in advance by considering the gamma characteristic when the blue reference frame image set according to a gradation of each pixel constituting the target frame is displayed.

6. A video correction method comprising:

calculating an intensity of re-entering illumination light that is first polarized light, among first polarized light entering a reflective liquid crystal display element through a polarizing plate which is included in illumination light having the first polarized light and second polarized light, for each pixel constituting a target frame of which video is analyzed in video data displayed on the reflective liquid crystal display element, by considering a gamma characteristic of an output gradation relative to an input gradation of the reflective liquid crystal display element, the first polarized light being reflected by the reflective liquid crystal display element without being modulated by the reflective liquid crystal display element, returning to a position closer to a light source unit than the polarizing plate, being reflected by an optical element located at a position closer to the light source unit than the polarizing plate or by the light source unit, and re-entering the reflective liquid crystal display element through the polarizing plate;

calculating a sum obtained by summing the intensity of the re-entering illumination light calculated for all pixels constituting the target frame;

calculating a difference between the sum calculated for the target frame, and a reference sum that is obtained by summing the intensity of the re-entering illumination light of each pixel constituting a reference frame image for all pixels and is calculated in advance by considering the gamma characteristic when the reference frame image set according to a gradation of each pixel constituting the target frame is displayed; and determining a correction amount to be added to or subtracted from a pixel value of each pixel constituting each frame in the video data by considering the gamma characteristic according to the difference.

* * * * *